May 31, 1932.   G. ANDERS   1,861,203

RADIORECEIVER

Filed Aug. 30, 1928

INVENTOR
GUIDO ANDERS
BY
ATTORNEY

Patented May 31, 1932

1,861,203

UNITED STATES PATENT OFFICE

GUIDO ANDERS, OF BERLIN-STEGLITZ, GERMANY, ASSIGNOR TO ALLGEMEINE ELEKTRIZITATS GESELLSCHAFT, OF BERLIN, N. W., GERMANY, A CORPORATION OF GERMANY

RADIORECEIVER

Application filed August 30, 1928, Serial No. 302,916, and in Germany September 2, 1927.

This invention relates to radio apparatus and in particular to radio receivers and associated power sources, which are enclosed in the same cabinet or closure.

The modern tendency in the radio receiver arts is to use the supply current of commercial lighting circuits for the feeding of tube receiver sets. For this purpose a separate device is used generally comprising current transformers and current smoothing apparatus adapted to be fed by current from the lighting circuit, and in turn to feed to the filament and plate circuits of the radio receiver the currents and potentials required for operation of the radio receiver. In this scheme, the line-connection means or battery substitutes are built either inside a distinct casing or conjointly with the receiver elements in a common case or box.

Now, the present invention is concerned with a radio tube receiver set comprising a built-in battery substitute in which disturbances in the signalling circuits caused by the action of the battery substitute and power circuits are largely avoided.

According to this invention, the receiver set and the leads brought from the battery substitute to the set are shielded on all sides by means of metal walls from the influences of the battery substitute and the power line.

Other features of the invention shall be explained further below by reference to the attached drawings, which by way of example shows one embodiment of the basic idea of the invention, and in which;

Fig. 3 is a view in plan of part of the channel wall with socket (base) connector contacts, whereby the filament leads are shielded from the grid and the plate leads, while.

Figure 1:
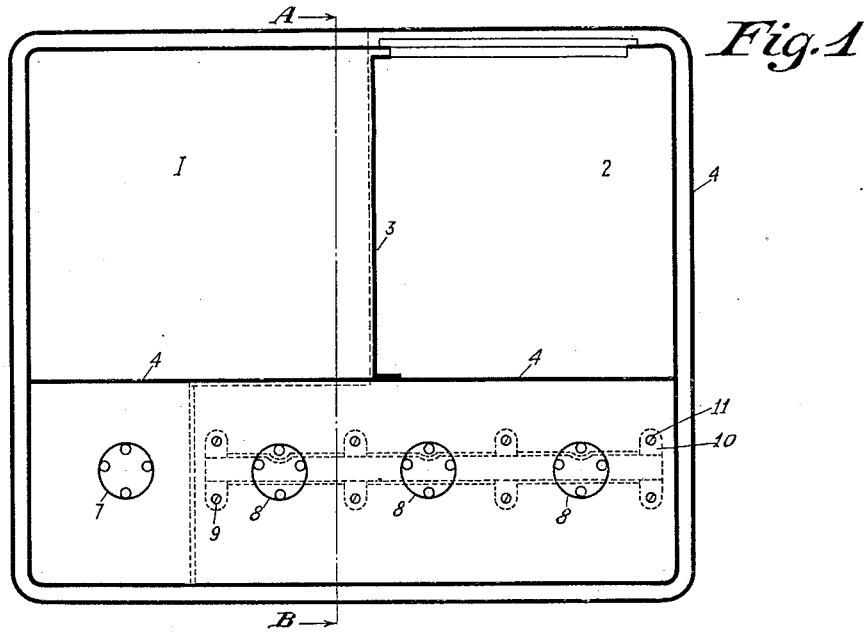
Fig. 1 is a cross-section through an alternating current rectifier.
Figure 2:
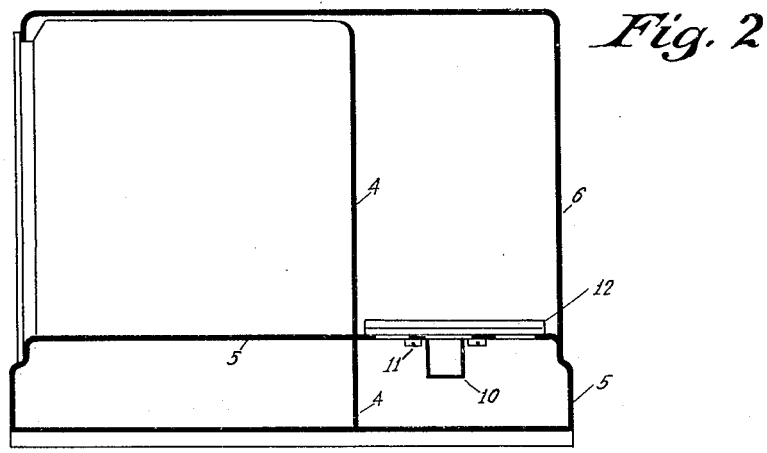
Fig. 2 is a longitudinal section on line A—B, of Fig. 1.

In Figs. 1 and 2, the receiver and battery substitute parts are not shown, because they are immaterial so far as the essential features of the invention are concerned.

Referring to Figure 1 of the drawings space 1 contains the battery substitute elements, while space 2 contains the receiver elements. As shown in the drawings these spaces are separated both inductively and capacitively by metal plates 3, 4, by a metal plate under part 5 and by a metal cap 6. In this way, all disturbances which might be set up in the receiver set from battery substitutes and from the battery substitute leads or power supply lines located outside the device are precluded. I provide besides the closures 1 and 2 two additional spaces in one of which are located elements of the receiver set and in the other of which are located battery substitute parts, respectively. In these closures as in the first mentioned closures, the receiver parts are shielded with reference to the battery eliminator parts.

Referring again to Fig. 1 of the drawings the rectifier-tube socket 7 and the receiver tube sockets 8 are disposed outside the spaces 1 and 2. However, the rectifier tube socket 7 is magnetically shielded with reference to the receiver tube sockets 8, such shielding being insured by the aid of metal plate 9. The receiver tubes, however, are not influenced by the rectifier leads.

Figure 3:
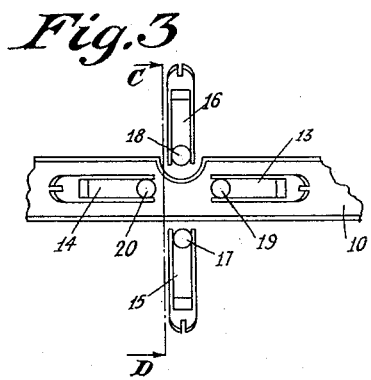
Figure 4:
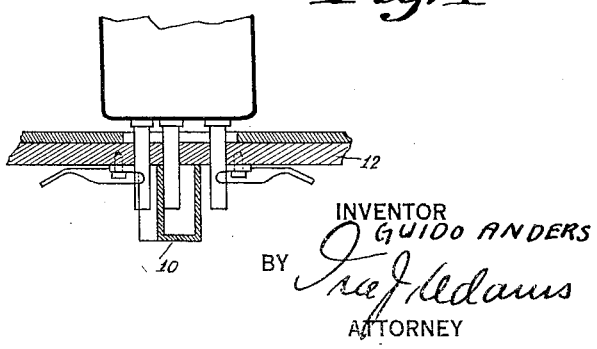
Fig. 4 is a longitudinal section on line C—D of Fig. 3.

Referring to Figure 2 of the drawings the filament leads for the receiver tubes are disposed inside a grounded metal channel 10 which by means of its lugs 11 is secured by screws on the insulating strip 12. Further details of the said metal-plate channel piece 10 can be seen from the Figs. 3 and 4. As shown in these figures the two terminals or contacts 13, 14, for the filament leads are disposed inside the channel piece 10. The plate terminal 15 and the grid terminal 16 of the tube base (socket), however, are located outside the channel 10. The terminal springs of the grid and plate contacts 15, 16, and the grid and plate plug pins 17, 18, are shielded magnetically from the filament terminals 13, 14, and the filament plug pins 19, 20, by means of the channel piece 10. In this way, all action by the filament current upon the grids and plates in receiver set tubes is precluded.

The said channel piece, compared with a sheathing or enveloping of the filament leads, offers this advantage that not only the filament leads, but also the corresponding contact springs of the socket and the plug pins of the tubes at the filament terminals are shielded.

Although for purposes of illustration I have described and illustrated one form of my invention it will be understood that I do not intend to limit myself thereby except as marked out in the claims appended hereto.

1. In radio apparatus, a cabinet enclosing a radio receiver and battery substitute apparatus therefor, shielding means separating said apparatus from said receiver, a sub-panel adapted to carry thermionic tubes for said receiver, a plurality of thermionic tube sockets supported by said panel, and means comprising a metal channel supported by said panel for shielding the plate and grid contacts of said sockets from the filament contacts of said sockets.

2. In radio apparatus, a cabinet enclosing a radio receiver and battery substitute apparatus therefor, shielding means separating said receiver from said battery substitute apparatus, a thermionic tube compartment, a sub-panel adapted to carry thermionic tubes for said receiver mounted in said compartment, a plurality of thermionic tube sockets supported by said sub-panel, means comprising a metal channel supported by said panel for shielding the plate and grid contacts of said sockets from the filament contacts of said sockets, and means for shielding said thermionic tube compartment from the rest of the apparatus.

3. In radio apparatus, a cabinet enclosing a radio receiver and battery substitute apparatus therefor, shielding means separating said receiver from said battery substitute apparatus, a sub-panel adapted to carry thermionic tubes for said receiver, a plurality of thermionic tube sockets supported by said sub-panel, and means comprising a metal channel supported by said panel for shielding the plate and grid contacts of said sockets and their associated connectors from the filament contacts of said sockets and their associated connectors.

4. A radio receiver having thermionic tubes, a battery substitute including a rectifier and a source of alternating current for the filaments of said receiver tubes, metallic shielding means separating said receiver from said battery substitute and means for preventing the alternating current leads to the filaments of the receiver tubes causing disturbances in said receiver including shielding means magnetically isolating the filament plug pins of the tube bases and the alternating current contacts of the tube sockets from the grid and plate plug pins of the tube bases and the contacts of the tube sockets.

5. In a radio receiver a power source therefor including alternating current windings for energizing the filaments of said receiver, shielding means between said receiver and said source including a metallic shield separating the filament terminals of the receiver tube sockets from the grid and plate terminals thereof.

6. In combination, a cabinet, a receiver and an alternating current rectifier housed therein, means for completely shielding said rectifier and receiver, said receiver including one, or more, tube sockets, and means for shielding the filament terminals of each socket.

7. In combination, a cabinet, a receiver and an alternating current rectifier housed therein, means for completely shielding said rectifier and receiver, said receiver including one, or more, tube sockets, and means for shielding the filament terminals of each socket from its remaining terminals.

8. In combination, in a radio receiver cabinet adapted to house a receiver and a pulsating current source therefor, a plurality of receiver tube sockets, and a shield surrounding the filament terminals of each socket.

In witness whereof, I have hereunto set my hand this 15th day of August 1928.

GUIDO ANDERS.